United States Patent
Dev Sharma et al.

(10) Patent No.: US 12,541,901 B2
(45) Date of Patent: Feb. 3, 2026

(54) SYSTEM AND METHOD OF REFINEMENT OF MACHINE LEARNING NETWORK PARAMETERS FOR IMPROVED PERFORMANCE

(71) Applicants: UNIVERSITY OF IOWA RESEARCH FOUNDATION, Iowa City, IA (US); CANON MEDICAL SYSTEMS CORPORATION, Tochigi (JP)

(72) Inventors: Samir Dev Sharma, Vernon Hills, IL (US); Mathews Jacob, Coralville, IA (US); Aniket Pramanik, Iowa City, IA (US); Sampada Bhave, Vernon Hills, IL (US)

(73) Assignees: UNIVERSITY OF IOWA RESEARCH FOUNDATION, Iowa City, IA (US); CANON MEDICAL SYSTEMS CORPORATION, Tochigi (JP)

( * ) Notice: Subject to any disclaimer, the term of this patent is extended or adjusted under 35 U.S.C. 154(b) by 319 days.

(21) Appl. No.: 18/324,811

(22) Filed: May 26, 2023

(65) Prior Publication Data
US 2024/0394934 A1    Nov. 28, 2024

(51) Int. Cl.
*G06T 11/00* (2006.01)
*G06T 5/70* (2024.01)
(Continued)

(52) U.S. Cl.
CPC ............. *G06T 11/008* (2013.01); *G06T 5/70* (2024.01); *G06T 5/73* (2024.01); *G06T 7/0012* (2013.01);
(Continued)

(58) Field of Classification Search
CPC . G06T 11/008; G06T 5/70; G06T 5/73; G06T 7/0012; G16H 30/40
See application file for complete search history.

(56) References Cited

U.S. PATENT DOCUMENTS

| | | |
|---|---|---|
| 2021/0082107 A1 | 3/2021 | Liu et al. |
| 2022/0051454 A1 | 2/2022 | Nickel et al. |

(Continued)

FOREIGN PATENT DOCUMENTS

CN    115423892 A    12/2022

OTHER PUBLICATIONS

Mani et al. ; MoDL: Model Based Deep Learning Architecture for Inverse Problems ; IEEE Trans Med Imaging 38(2) ; Feb. 1, 2020 ; 31 Pages.

*Primary Examiner* — John R Wallace
(74) *Attorney, Agent, or Firm* — Oblon, McClelland, Maier & Neustadt, L.L.P.

(57) ABSTRACT

A method for machine learning includes learning, during a training stage, network parameter values of a neural network to obtain a trained neural network configured to perform reconstruction of medical images; refining, during a subsequent refinement stage, the learned network parameter values to generate refined network parameter values defining a refined neural network; and applying input medical image data to the refined neural network to generate a reconstructed medical image. The method retains benefits of machine learning image reconstruction to obtain a desired reconstructed image.

18 Claims, 12 Drawing Sheets

(51) Int. Cl.
*G06T 5/73* (2024.01)
*G06T 7/00* (2017.01)
*G16H 30/40* (2018.01)

(52) U.S. Cl.
CPC ... *G16H 30/40* (2018.01); *G06T 2207/10088* (2013.01); *G06T 2207/20081* (2013.01); *G06T 2207/20084* (2013.01); *G06T 2207/30016* (2013.01)

(56) References Cited

U.S. PATENT DOCUMENTS

2022/0327662 A1   10/2022   Matsuura et al.
2023/0236271 A1*  7/2023   Fessler ..................... G06T 5/70
                                                    324/309

* cited by examiner

FIG. 10C using refined network (refine λ)
FIG. 10B reference
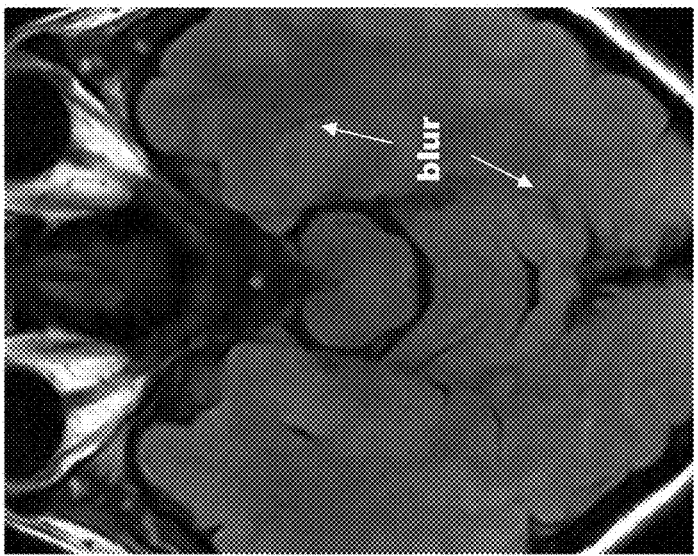
FIG. 10A using trained network

SYSTEM AND METHOD OF REFINEMENT OF MACHINE LEARNING NETWORK PARAMETERS FOR IMPROVED PERFORMANCE

CROSS-REFERENCE TO RELATED APPLICATIONS

This application is related to provisional Application No. 63/422,594, filed Nov. 4, 2022, the entire contents of which are incorporated herein by reference.

BACKGROUND

Field

The present disclosure is directed to a system and method of medical image reconstruction using neural networks, and in particular, a method of training a machine learning network that includes a training stage to yield a trained neural network that meets a required error threshold, and an added refinement stage after the training stage, to refine the network parameter values to yield a refined neural network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Machine-learning-based image reconstruction approaches are being used to accelerate magnetic resonance (MR) data acquisition. As an example, Siemens Deep Resolve™ uses convolutional neural networks to accelerate MR scans, e.g., by about 70% for brain imaging. Faster scans help to improve patient experience. As another example, Philips SmartSpeed™ speeds up scan time while improving image quality. SmartSpeed uses two radiological technologies, including a compressed SENSE speed engine and adaptive CS-net reconstruction. The compressed SENSE speed engine uses a sparse sampling approach to maximize speed while preserving details. The adaptive CS-net reconstruction is trained with compressed SENSE data as input and is applied at the source of the MR signal to ensure maximum data and image fidelity.

In each case, the machine-learning reconstruction methods learn network parameters in a training stage. The trained network is then used to generate images in an inference stage. Subsequently, an assumption is that the network learns the characteristics of the desired image during the training stage. However, in practice, the image output by machine-learning reconstruction generally do not exhibit desired image characteristics. The visual perception of the image can be different than what the network learns. Further, image quality (IQ) can vary across different sites.

In machine learning, artefact correction methods can be applied. One approach to artefact correction is to blend the network output image with a second image to form an output image with a desired IQ. Image blending has been applied in image denoising. The network output image is blended with the input, noisy image. However, blending is limited to cases where a second image can be created. Such an approach will not work in the case of image reconstruction, as a second image with good image quality is not available.

Another approach is to use the machine-learning image reconstruction image only as a "prior" in a model-based iterative reconstruction. In this approach, full reconstruction includes a first stage machine-learning reconstruction and a second stage of estimate refinement using model-based reconstruction. However, this approach loses the computational benefits of machine-learning image reconstruction.

Accordingly, it is one object of the present disclosure to provide systems and methods of achieving preferred image quality in MR images while maintaining computational efficiency of machine-learning image reconstruction.

SUMMARY

An aspect of the present disclosure is a method of machine learning, that can include learning, via processing circuitry during a training stage, network parameter values of a neural network to obtain a trained neural network configured to perform reconstruction of medical images; refining, via the processing circuitry during a subsequent refinement stage, the learned network parameter values of the trained neural network to generate refined network parameter values defining a refined neural network; and applying, via the processing circuitry, input medical image data to the refined neural network to generate a reconstructed medical image.

A further aspect of the present disclosure is an apparatus that can include processing circuitry configured to learn, during a training stage, network parameter values of a neural network to obtain a trained neural network configured to perform reconstruction of medical images; refine, during a subsequent refinement stage, the learned network parameter values of the trained neural network to generate refined network parameter values defining a refined neural network; and apply input medical image data to the refined neural network to generate a reconstructed medical image.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 10A, 10B, and 10C illustrate images resulting from inferencing;

DETAILED DESCRIPTION

Figure 1:
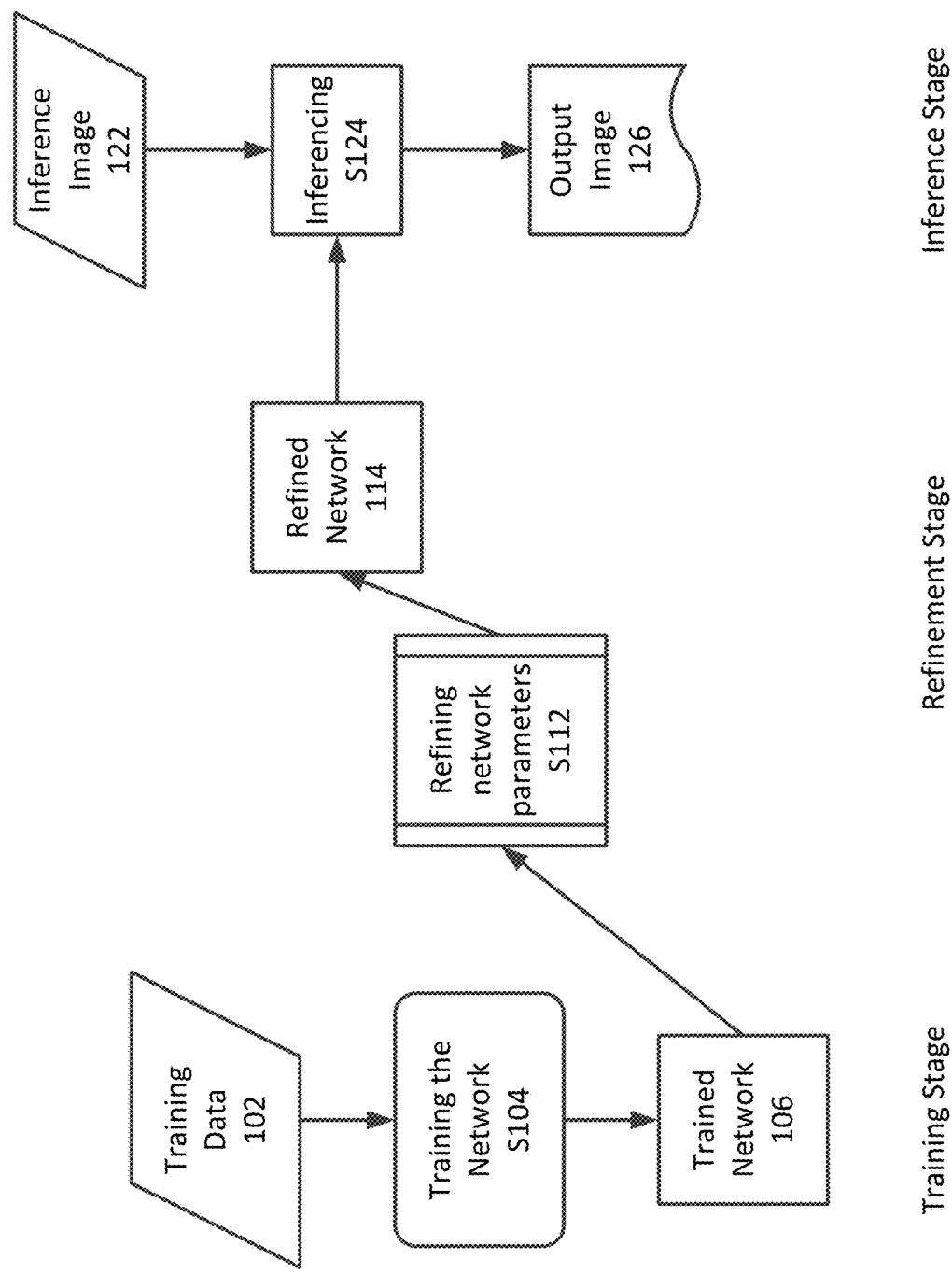
FIG. 1 is a flow diagram of the image reconstruction approach in according to an exemplary aspect of the disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As mentioned above, a conventional approach to machine-learning artefact reduction requires a second image for blending. The blending approach will not work in image reconstruction, as a second image with good image quality is not available. The Siemens machine-learning reconstruction method uses a two-step approach. The first step is to perform machine-learning reconstruction. The second step is to do CG-SENSE reconstruction using a machine-learning output as a regularizer. Although a regularization parameter can be varied in the second step, the regularization parameter is not learned. Also, the Siemens approach loses the benefit of fast machine-learning reconstruction. The Philips approach automatically chooses regularization during the inference. Philips does not disclose learning a regularization parameter.

The present disclosed embodiments include a refinement stage in order to achieve desired image quality in MR image reconstruction on a consistent basis.

To overcome the above challenges, the present disclosure uses a conditional unrolled neural network architecture. In one embodiment, the method alternates between data-consistency and machine learning network blocks, with relative weighting of the blocks set by the regularization parameter 1. The regularization parameter is learned during training, refined in the refinement stage, and then applied during inference. The regularization parameter can be refined to be equal for all the unrolls. The regularization parameter can be refined to be different for each of the unrolls. The network weights can be refined to be equal for all the unrolls. The network weights can be refined to be different for each of the unrolls. The regularization parameter value can be refined based on quantitative metrics such as PSNR or SSIM. The regularization parameter value can be refined based on human (e.g. radiologist) preference. The regularization parameter value can be refined based on image characteristics such as SNR or contrast.

FIG. 1 is a flow diagram of the image reconstruction approach of the present disclosure. The present disclosure adds a refinement stage between the training stage and the inference stage.

In the training stage, training data 102 is used to train a deep learning neural network, such as a convolutional neural network (CNN) or a U-Net for image reconstruction. Training performed in step S104 can include a form of supervised learning. When a training loss function reaches a predetermined training criteria, the resulting neural network is a trained neural network 106. As noted above, an image reconstructed using the trained neural network can be blurry and/or noisy.

Subsequently, in the refinement stage, in S112, the learned machine learning network parameters of the trained neural network are refined. The network parameters are refined to generate a refined network 114 to achieve a desired image quality.

In the inference stage, an inference image 122 is input. In step S124, the refined machine learning network outputs a reconstructed image 126 having desired image quality characteristics, while retaining the benefits, including speed, of machine-learning image reconstruction (MLR).

For purposes of background, an imaging system can be formulated as an operator $\mathcal{A}$ that acts on a continuous domain image $x: \mathbb{R}^2 \rightarrow \mathbb{C}$ to yield a vector of measurements $\mathcal{A}(x)=b \in \mathbb{C}^N$. The goal of image reconstruction is to recover a discrete approximation, denoted by the vector $x \in \mathbb{R}^P$ from b. Conventional model-based imaging schemes use a discrete approximation of $\mathcal{A}$, that maps x to b. Conventional model-based algorithms make the assumption that $$B = \mathcal{A}(x).$$

For example, in the single-channel Cartesian MRI acquisition setting, $\mathcal{A}$=SF, where F is the 2-D discrete Fourier transform, while S is the fat sampling matrix that pick rows of the Fourier matrix.

The recovery of x from b is ill-posed, especially when A is a rectangular matrix. The general practice in conventional model-based imaging is to pose the recovery as a regularized optimization scheme:

$$x = \mathrm{argmin}_x \|Ax - b\|_2^2 + \lambda R(x)$$

where, $\lambda$ is a regularization parameter. The regularization prior $R: \mathbb{C}^n \rightarrow \mathbb{R}_{>0}$ is engineered to restrict the solutions to the space of desirable images. For example, R(x) is a small scalar when x is a noise and artifact-free image, while its value is high for noisy images. Classical choices include norms of wavelet coefficients, total variation, as well as their combinations.

Alternatively, conventional deep learning based algorithms recover the images as $$X_{rec} = T_w(A^H b),$$

where $T_w$ is a learned CNN. The operator $A^H(\bullet)$ transforms the measurement data to the image domain, since CNNs are designed to work in the image domain. This gives the relation $$X_{rec} = T_w(A^H A x),$$

Thus, the CNN network is learned to invert the normal operator $A^H A$: i.e., $T_{w \approx}(A^H A)^{-1}$ for signals living in the image set.

For many measurement operators (e.g., Fourier sampling, blurring, and projection imaging), $A^H A$ is a translation-invariant operator; the convolutional structure makes it possible for CNNs to solve such problems. However, the receptive field of the CNN has to be comparable to the support of the point-spread function corresponding to $(A^H A)$. In applications involving Fourier sampling or projection imaging, the receptive field of the CNNs has to be the same as that of the image; large networks such as UNET with several layers are required to obtain such a large receptive field. A challenge with such large network with many free parameters is the need for extensive training data to reliably train the parameters. Another challenge is that the CNN structure may not be well-suited for problems such as parallel MRI, where $A^H A$ is not translational-invariant.

A framework, termed as Model-based reconstruction using Deep Learning priors (MoDL), merges the model-based reconstruction schemes with a deep learning-based algorithm. The overall framework involves a data-consistency layer that takes output from a learned CNN to capture image redundancy.

In the present disclosure, the reconstruction of the image $x \in \mathbb{C}^n$ is formulated as an optimization:

$$x_{rec} = \underset{x}{\operatorname{argmin}} \underbrace{\|A(x) - b\|_2^2}_{\text{data consistency}} + \lambda \underbrace{\|\mathcal{N}_w(x)\|^2}_{\text{regularization}}.$$

where $\mathcal{N}_w$ is a learned CNN estimator of noise and alias patterns, which depends on the learned parameters w.

Figure 2:
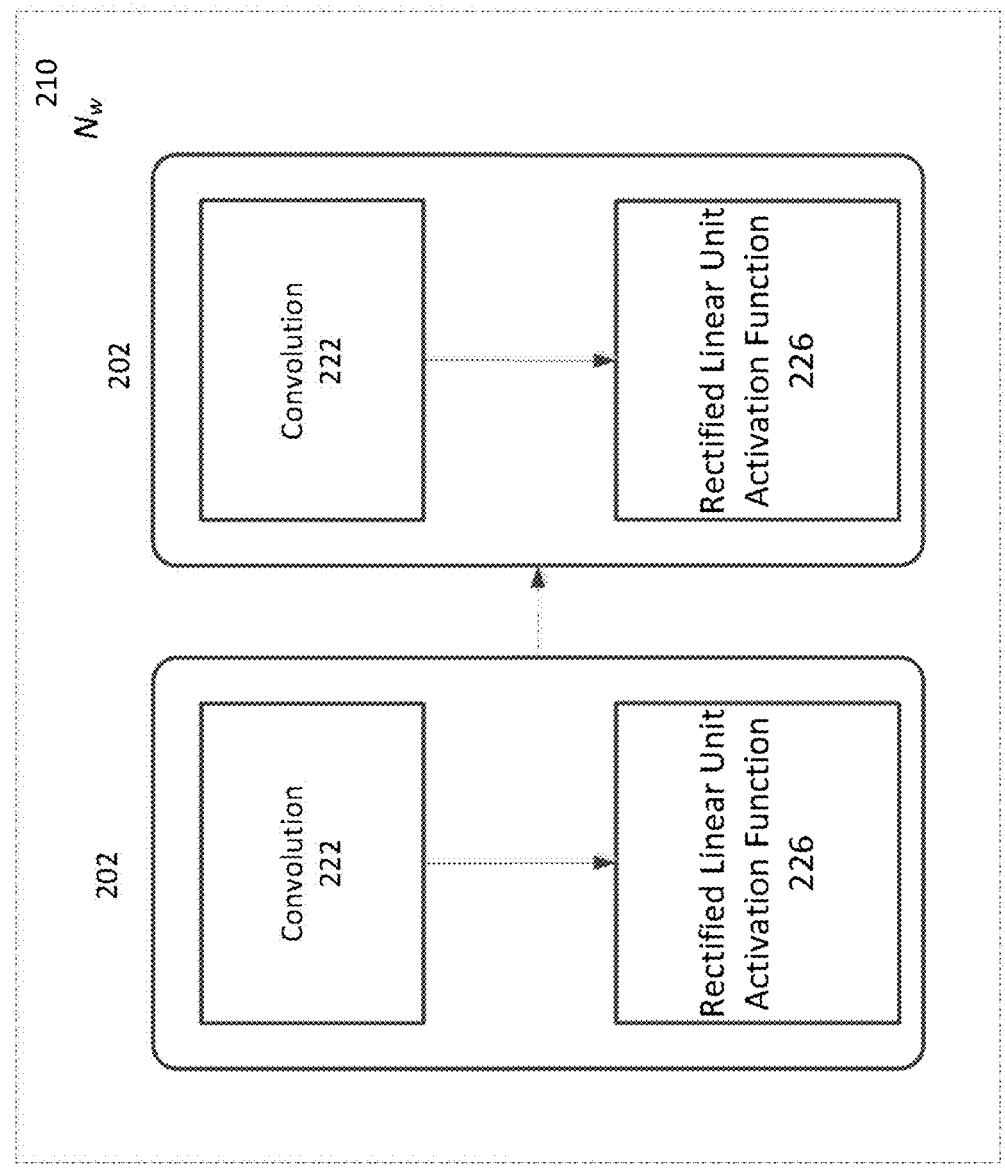
FIG. 2 is a block diagram for a CNN for use in image reconstruction.

FIG. 2 is a block diagram for a CNN for use in image reconstruction. In one embodiment, the CNN is an N layer model with 64 filters at each layer to implement the $\mathcal{N}_w$ block 210. Each layer 202 consists of convolution 222 and a non-linear activation function ReLU 226 (rectified linear unit, $f(x)=\max(0, x)$). Following the residual learning strategy, the learned noise from $\mathcal{N}_w$ block 210 is added with the input of $\mathcal{N}_w$ block to obtain the reconstructed image. The output of $\mathcal{N}_w$ block 210 is fetched into data consistency (DC) layer as shown in FIG. 3.

Figure 3:
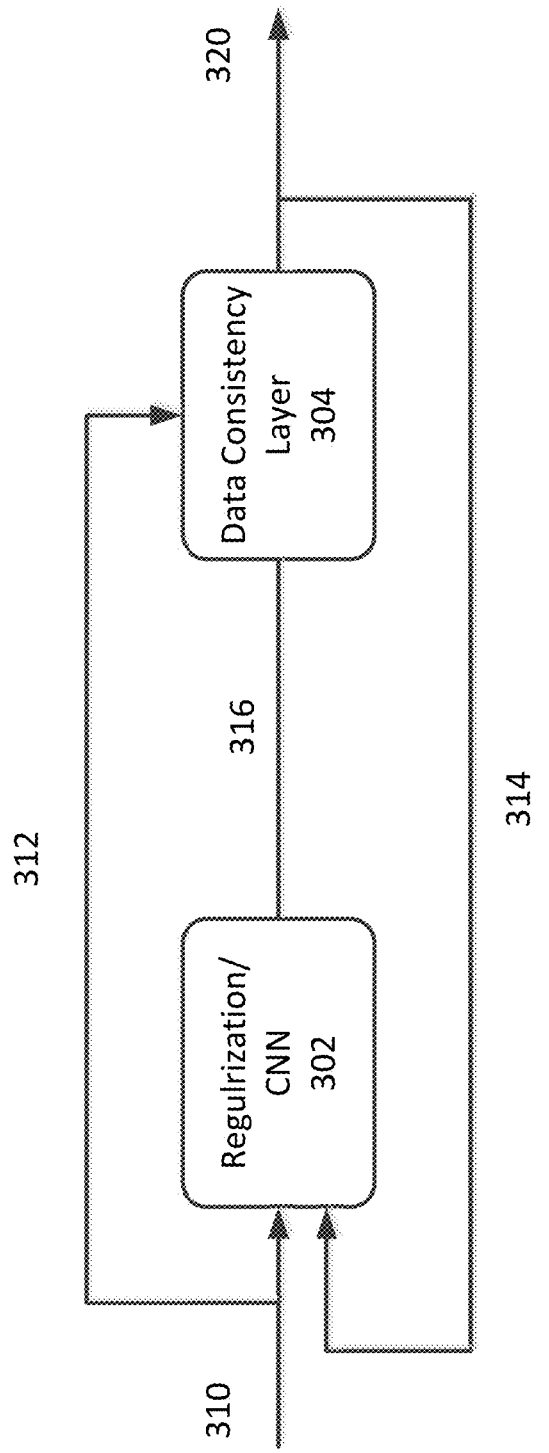
FIG. 3 is a block diagram for a framework that uses an alternating recursive algorithm.

As shown in FIG. 3, this framework uses an alternating recursive algorithm 314, which, when unrolled, yields a deep network. The network consists of interleaved CNN blocks 302, which captures the information about the image set 310, and data consistency blocks 304 that encourages consistency with the measurements 312. The data consistency block 304 involves a quadratic sub-problem, which has analytical solutions for simpler problems such as single channel MRI recovery.

In the MoDL framework, the CNN parameters [$\mathcal{N}_w(x)$] and a regularization parameter $\lambda$ are learned in the training stage. However, it has been found in practice that the estimated image using MoDL tends to include blur artefacts and noise artefacts. Disclosed embodiments add a refinement stage before the inference stage in order to achieve a preferred image quality with less blur artefact and less noise artefact.

The refinement stage is performed on the trained network. In some embodiments, the data used for the refinement stage can be the original training data. Also, for embodiments in which the network weights are refined via a retraining, the original training set can be used.

In some embodiments, the regularization parameter $\lambda$ is first learned in the training stage and then refined before the inference stage. In some embodiments, the regularization parameter is refined to be equal for all of the unrolls. In some embodiments, the regularization parameter is refined to be different for each of the unrolls.

Figure 4:
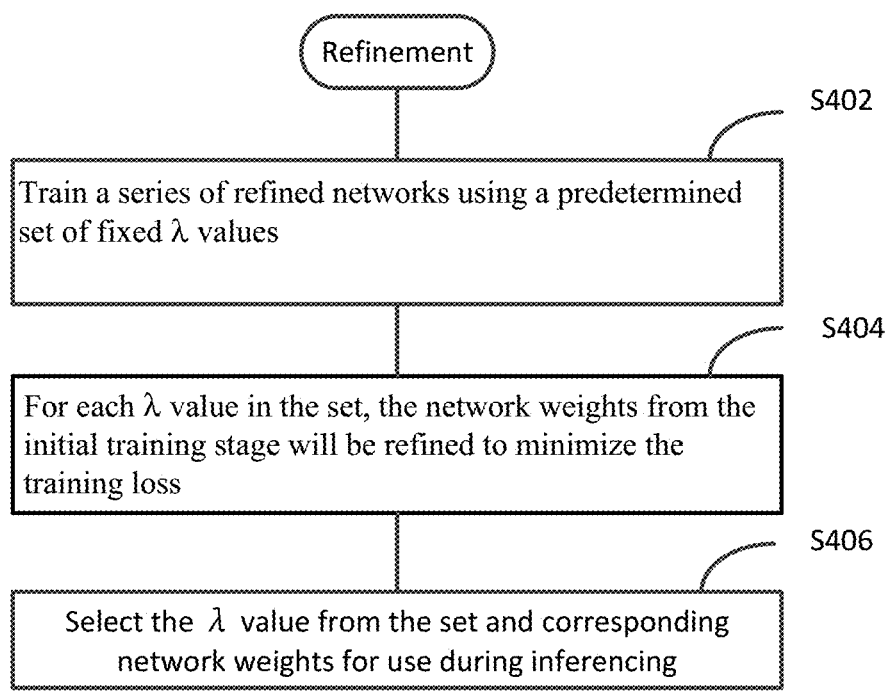
FIG. 4 is a flowchart of the refinement step in FIG. 1.

FIG. 4 is a flowchart of one embodiment of the refinement step S112. In some embodiments, the network parameter $\lambda$ is updated in the refinement stage in order to improve the IQ in the inference stage. The refinement stage can include updating convolution kernel weights for a chosen $\lambda$ value.

In step S402, the convolution kernel weights can be updated by a method in which a set of trained networks are further refined using a corresponding set of $\lambda$ values.

In step S404, for each $\lambda$ value in the set, the network weights from the initial training stage are refined to minimize the training loss.

Then, in step S406, a particular $\lambda$ value is selected as the one producing a preferred image quality and the network weights from the refinement training stage corresponding to the selected particular value of $\lambda$ are used during inferencing.

In some embodiments, the convolution kernel weights can be updated in step S402 without the retraining step S404. In some embodiments, the convolution kernel weights are refined to be equal for all unrolls. In some embodiments, the convolution kernel weights are refined to be different for all unrolls. In one embodiment, the trained weight parameters can be adjusted by scaling, in which all, or a subset, of the weights are multiplied or divided by a scale factor. In one embodiment, a majority of the weights are modified. The scale factor can be an integer value, for example two, where all weights are divided by two. In some embodiments, the scale factor can be much larger, on the order of 200. In some embodiments, the scale factor is determined empirically.

In some embodiments, trained weight parameters can be refined to produce a preferred image quality. The trained parameters can be refined using any of several methods and resulting values can be evaluated using image quality metrics. In one embodiment, in the refinement stage, the trained parameters can be adjusted to arbitrary new values and the resulting values can be evaluated using image quality metrics such as a structural similarity index (SSIM), peak signal-to-noise ratio (PSNR), or entropy. In one embodiment, an image resulting from the refinement method can be displayed to a radiologist for evaluation of image quality.

In one embodiment, an imaging system includes an input interface and a display to display a reconstructed medical image that is output from the refined neural network. The regularization parameter value is then refined based on a preferred regularization parameter input via the input interface based on the displayed reconstructed medical image.

In one embodiment, an optimal refined image can be selected based on characteristics of an inference dataset, e.g., signal-to-noise ratio or contrast.

FIGS. 5 to 10 illustrate examples of reconstructed MRI images at stages of the present image reconstruction approach as in the flowchart of FIG. 1.

Figure 5:
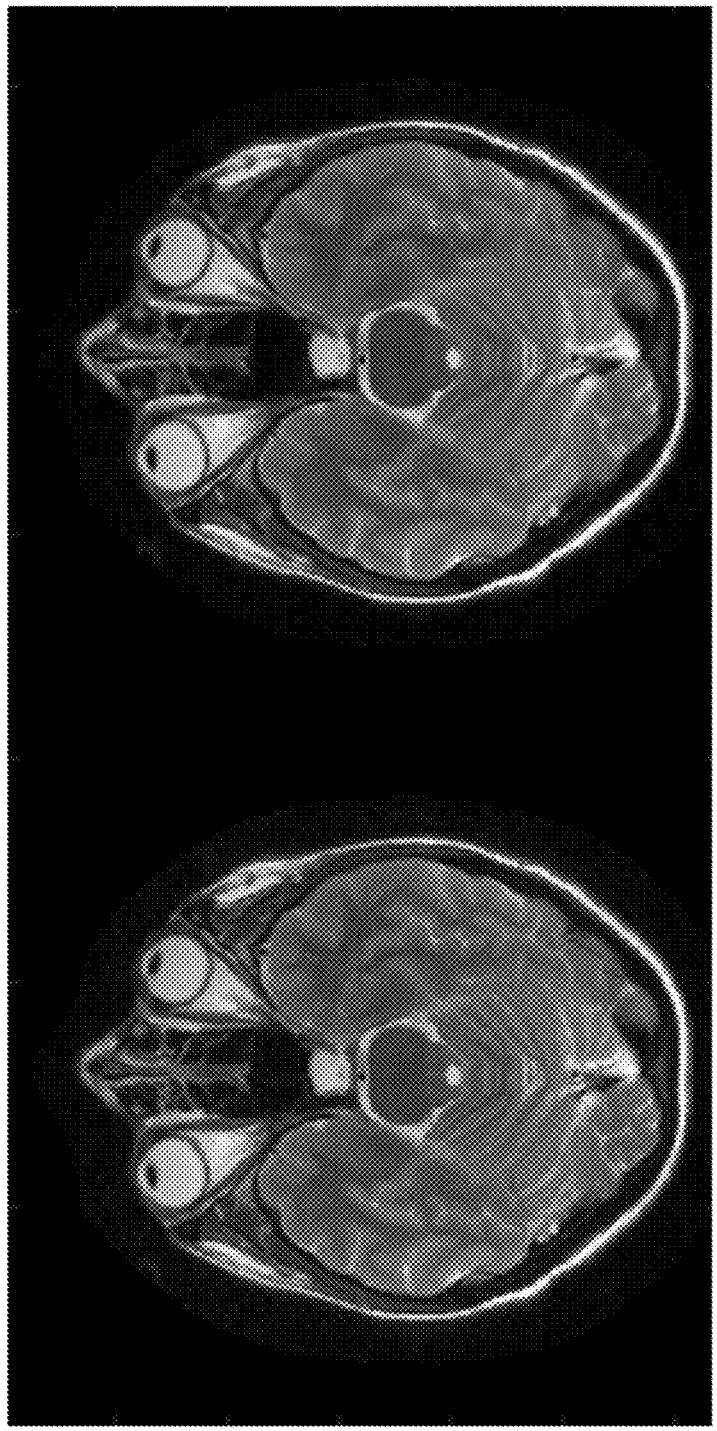
FIG. 5 illustrates an image as an output of the training stage of FIG. 1.

FIG. 5 illustrates an image 104 as an output of the training stage. Although the image from the trained network shows some of the distinguishing features, the output from the training stage S104 is blurry compared to a reference image.

Figure 6:
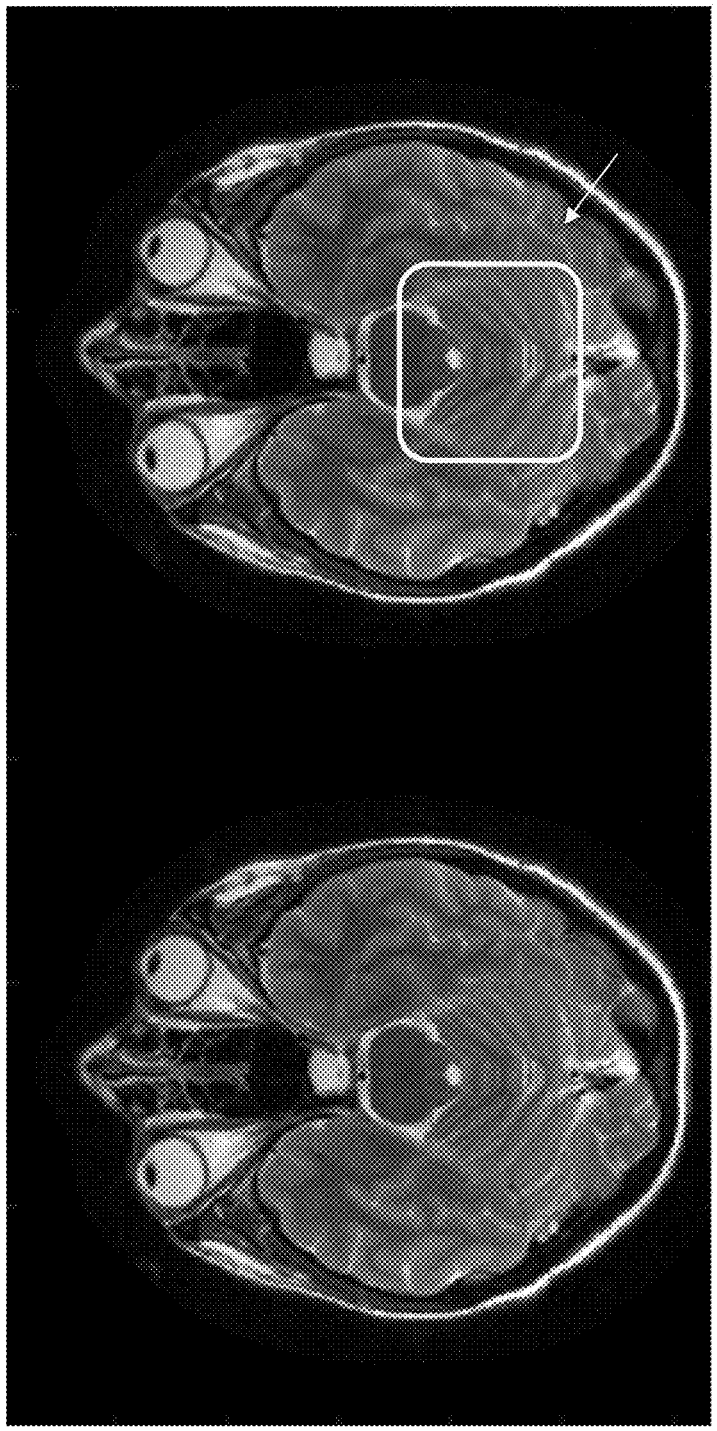
FIG. 6 illustrates an image as an output of the refinement stage of FIG. 1.

FIG. 6 illustrates an image 114 as an output of the refinement stage. The image in FIG. 6 results from a refinement stage in which the value of the regularization parameter $\lambda$ is refined during the refinement stage. The output of the refinement stage achieves the desired image quality.

Figure 7:
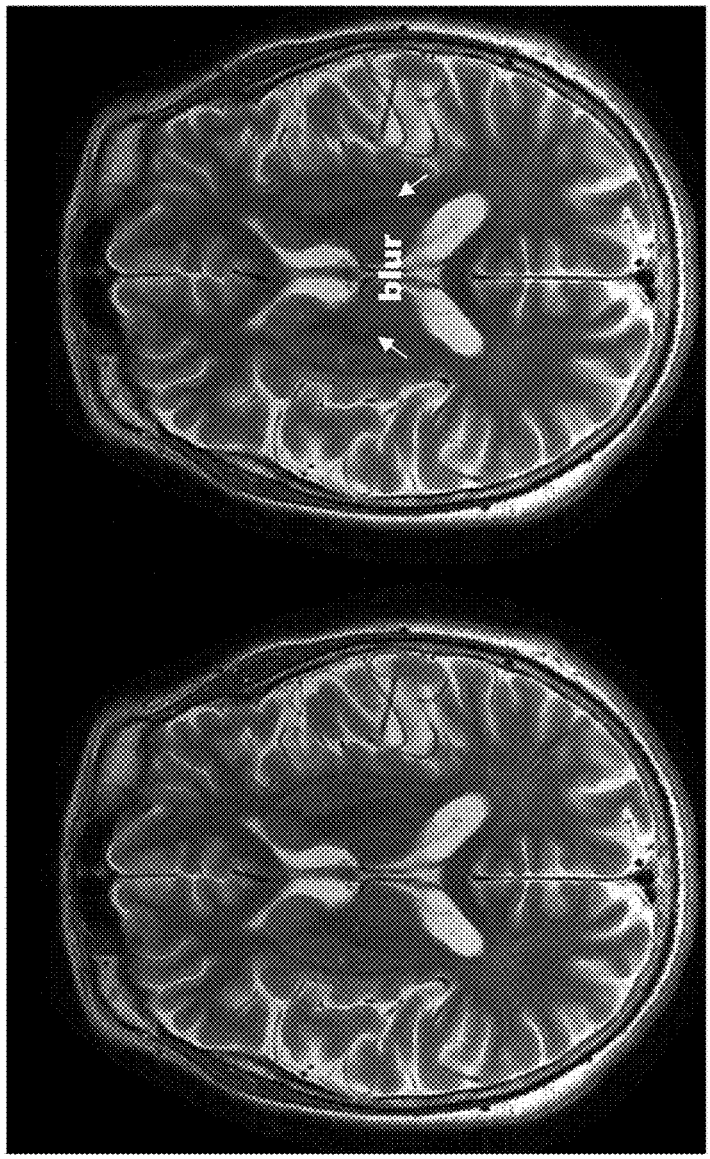
FIG. 7 illustrates another image as an output of the training stage of FIG. 1.

FIG. 7 illustrates another image 104 as an output of the training stage. Again, the output from the training stage S104 is blurry compared to the reference image.

Figure 8:
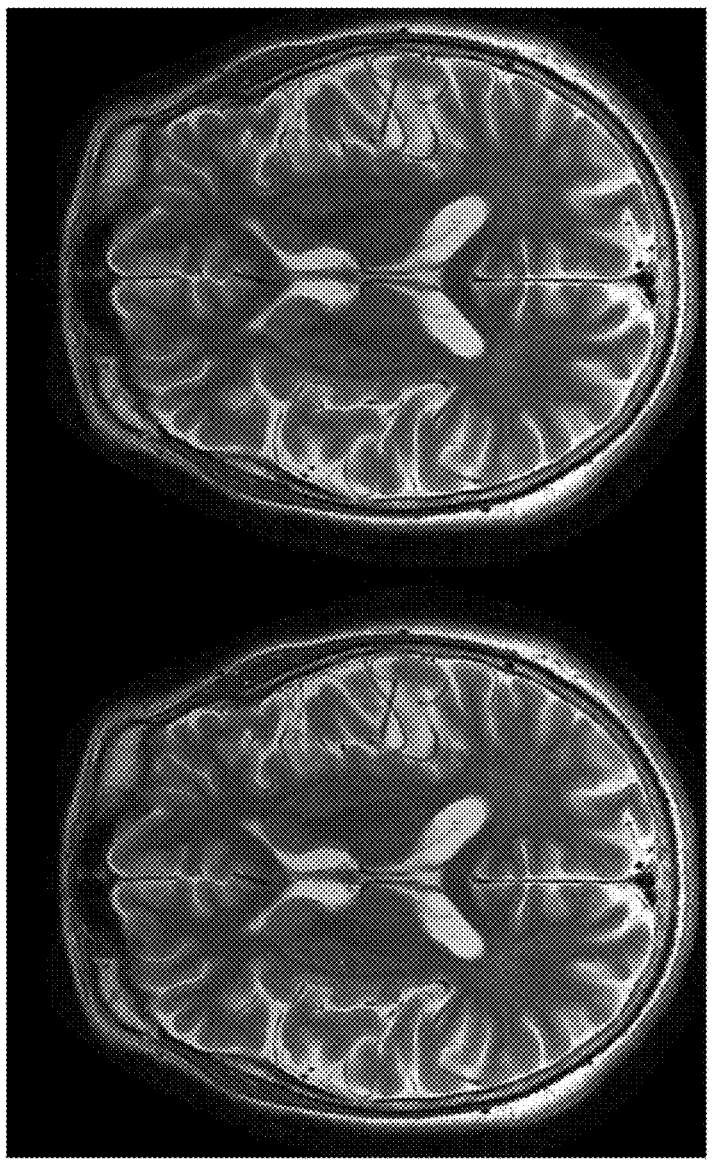
FIG. 8 illustrates another image as an output of the refinement stage of FIG. 1.

FIG. 8 illustrates an image 114 as an output of the refinement stage. The output of the refinement stage achieves the desired image quality.

Figure 9:
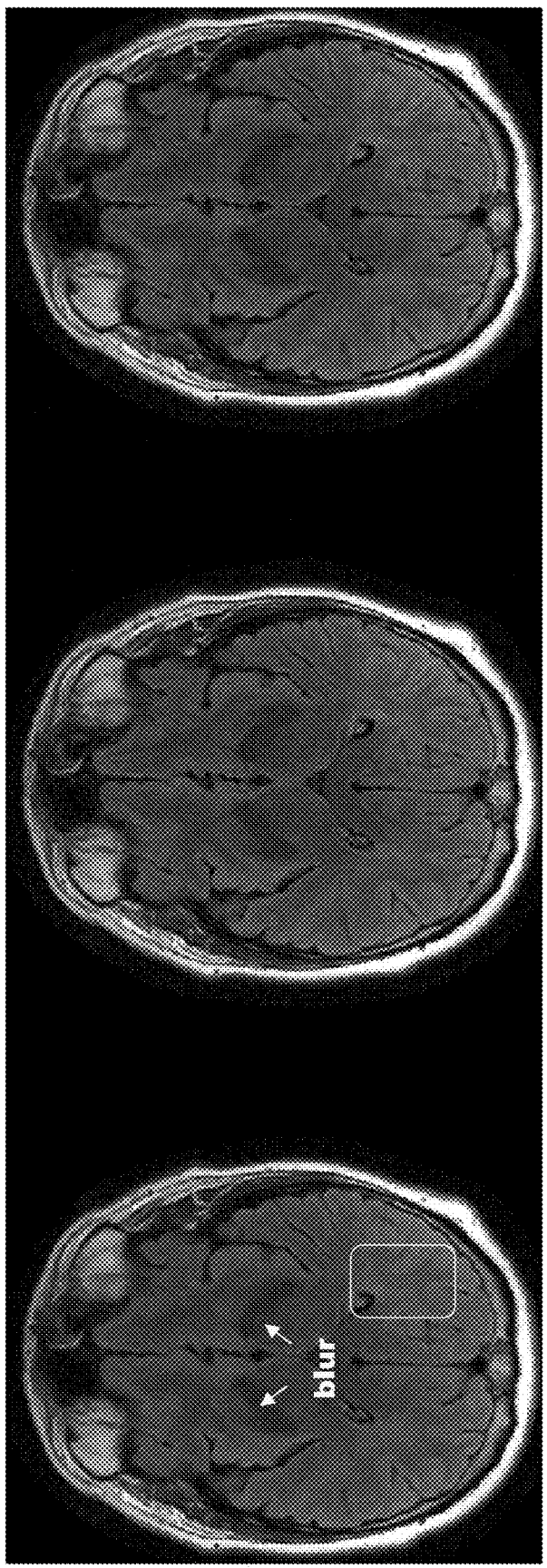
FIG. 9 illustrates an image resulting from inferencing.

FIG. 9 illustrates an image resulting from inferencing. The left side of FIG. 9 is an output image 126 obtained using the trained network as the inferencing model in step S124. The middle image of FIG. 9 is an output image 126 obtained using a refined network as the inferencing model in step S124. The output image on the left of FIG. 9 contains a region of blur, while the output image on the right side of FIG. 9 is an image of desired image quality.

FIGS. 10A, 10B, and 10C illustrate images resulting from inferencing. FIG. 10A shows an output image 126 obtained using the trained network as the inferencing model in step S124. FIG. 10B shows an output image 126 obtained using a refined network as the inferencing model in step S124. Again, the output image using the trained network in FIG. 10A contains a region of blur, while the output image using the refined network in FIG. 10C is an image of desired image quality.

Figure 11:
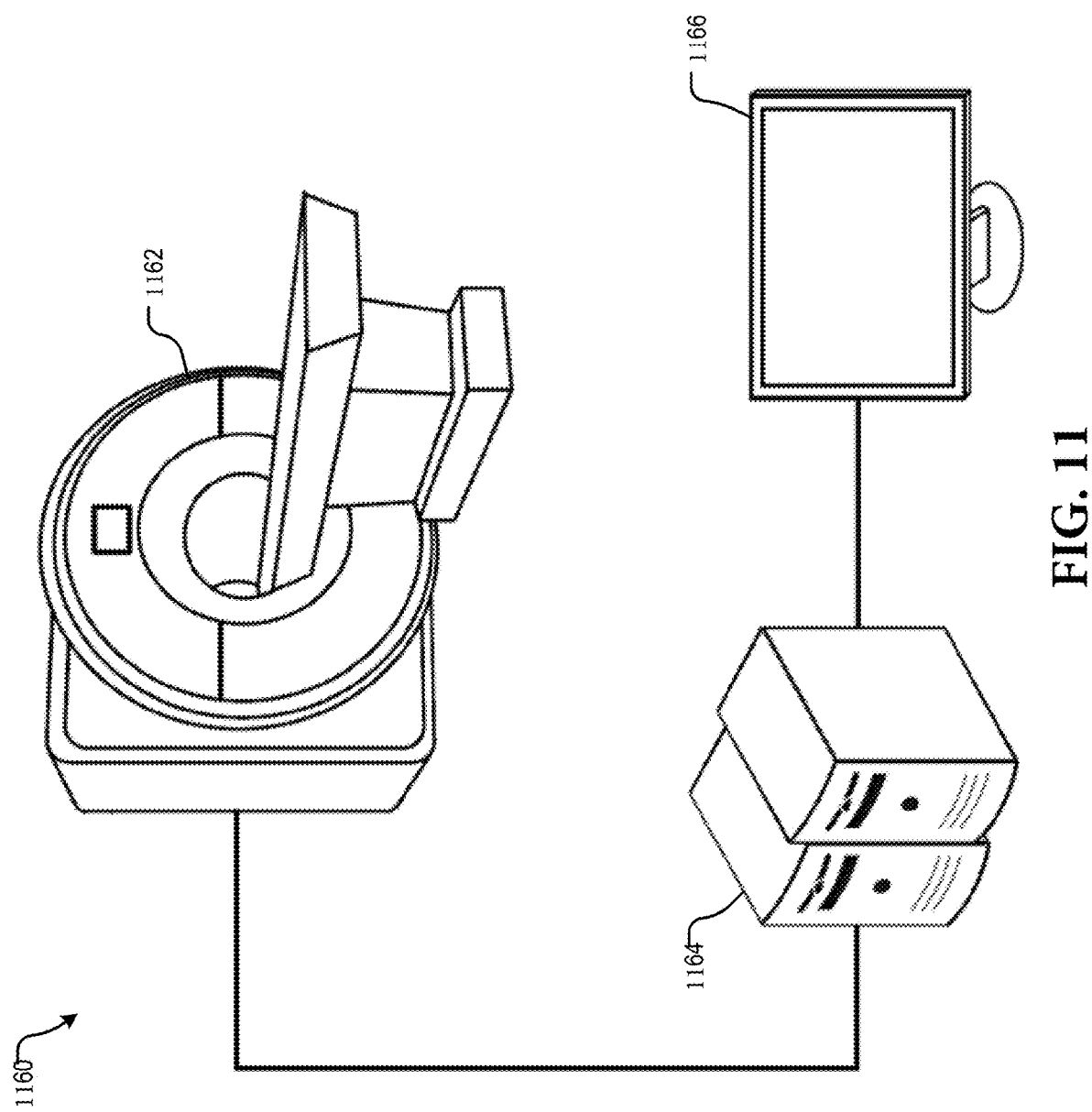
FIG. 11 is an illustration of a medical imaging system, according to an exemplary embodiment of the present disclosure.

FIG. 11 illustrates an example embodiment of a medical-imaging system 1160 within which embodiments of the present disclosure can be implemented. The medical-imaging system 1160 includes at least one scanning device 1162, one or more image-generation devices 1164, each of which is a specially-configured computing device (e.g., a specially-configured desktop computer, a specially-configured laptop computer, a specially-configured server), and a display device 1166.

The scanning device 1162 is configured to acquire scan data by scanning a region (e.g., area, volume, slice) of an object (e.g., a patient). The scanning modality may be, for example, magnetic resonance imaging (MRI), computed tomography (CT), positron emission tomography (PET), X-ray radiography, and ultrasonography.

The one or more image-generation devices 1164 obtain scan data from the scanning device 1162 and generate an image of the region of the object based on the scan data. To generate the image, for example during intermediate image generation or during final image reconstruction, the one or more image-generation devices 1164 may perform a reconstruction process on the scan data. Examples of reconstruction processes include GRAPPA, CG-SENSE, SENSE, ARC, SPIRIT, and LORAKS, and compressed sensing.

In an embodiment, after the one or more image-generation devices 1164 generate the image, the one or more image-generation devices 1164 send the image to the display device 1164, which displays the image.

In another embodiment, and further to the above, the one or more image-generation devices 1164 may generate two images from the same scan data. The one or more image-generation devices 1164 may use different reconstruction processes to generate the two images from the same scan data, and one image may have a lower resolution than the other image. Additionally, the one or more image-generation devices 1164 may generate an image.

Figure 12:
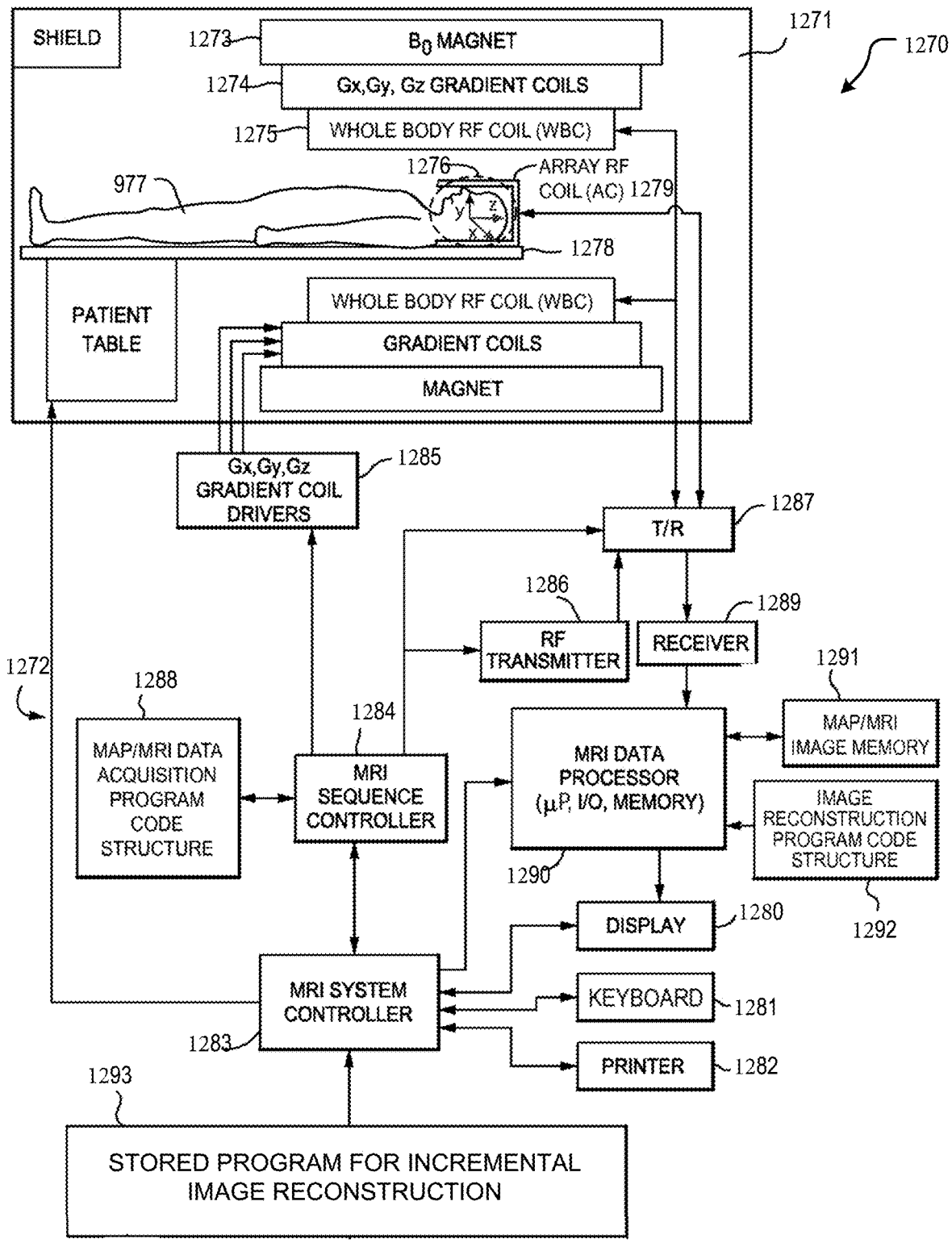
FIG. 12 is a schematic block diagram of a magnetic resonance imaging system, according to an exemplary implementation of the present disclosure.

Referring now to FIG. 12, a non-limiting example of a magnetic resonance imaging (MRI) system 1270 is shown. The MRI system 1270 depicted in FIG. 12 includes a gantry 1271 (shown in a schematic cross-section) and various related system components 1272 interfaced therewith. At least the gantry 1271 is typically located in a shielded room. The MRI system geometry depicted in FIG. 12 includes a substantially coaxial cylindrical arrangement of the static field $B_0$ magnet 1273, a Gx, Gy, and Gz gradient coil set 974, and a large whole-body RF coil (WBC) assembly 1275. Along a horizontal axis of this cylindrical array of elements is an imaging volume 1276 shown as substantially encompassing the head of a patient 1277 supported by a patient table 1278.

One or more smaller array RF coils 1279 can be more closely coupled to the patient's head (referred to herein, for example, as "scanned object" or "object") in imaging volume 1276. As those in the art will appreciate, compared to the WBC (whole-body coil), relatively small coils and/or arrays, such as surface coils or the like, are often customized for particular body parts (e.g., arms, shoulders, elbows, wrists, knees, legs, chest, spine, etc.). Such smaller RF coils are referred to herein as array coils (AC) or phased-array coils (PAC). These can include at least one coil configured to transmit RF signals into the imaging volume, and a plurality of receiver coils configured to receive RF signals from an object, such as the patient's head, in the imaging volume 1276.

The MRI system 1270 includes a MRI system controller 1283 that has input/output ports connected to a display 1280, a keyboard 1281, and a printer 1282. As will be appreciated, the display 1280 can be of the touch-screen variety so that it provides control inputs as well. A mouse or other I/O device(s) can also be provided.

The MRI system controller 1283 interfaces with a MRI sequence controller 1284, which, in turn, controls the Gx, Gy, and Gz gradient coil drivers 1285, as well as the RF transmitter 1286, and the transmit/receive switch 1287 (if the same RF coil is used for both transmission and reception). The MRI sequence controller 1284 includes suitable program code structure 1288 for implementing MRI imaging (also known as nuclear magnetic resonance, or NMR, imaging) techniques including parallel imaging. Moreover, the MRI sequence controller 1284 includes processing circuitry to execute the scan control process illustrated in FIG. 1. The MRI sequence controller 1284 can be configured for MR imaging with or without parallel imaging. Moreover, the MRI sequence controller 1284 can facilitate one or more preparation scan (pre-scan) sequences, and a scan sequence to obtain a main scan magnetic resonance (MR) image (referred to as a diagnostic image). MR data from pre-scans can be used, for example, to determine sensitivity maps for RF coils 1275 and/or 1279 (sometimes referred to as coil sensitivity maps or spatial sensitivity maps), and to determine unfolding maps for parallel imaging.

The MRI system components 1272 include an RF receiver 1289 providing input to data processor 1290 so as to create processed image data, which is sent to display 1280. The MRI data processor 1290 is also configured to access previously generated MR data, images, and/or maps, such as, for example, coil sensitivity maps, parallel image unfolding maps, distortion maps and/or system configuration parameters 1291, and MRI image reconstruction program code structures 1292 and 1293.

In one embodiment, the MRI data processor 1290 includes processing circuitry. The processing circuitry can include devices such as an application-specific integrated circuit (ASIC), configurable logic devices (e.g., simple programmable logic devices (SPLDs), complex programmable logic devices (CPLDs), and field programmable gate arrays (FPGAs), and other circuit components that are arranged to perform the functions recited in the present disclosure.

The processor 1290 executes one or more sequences of one or more instructions, such as method 100 described herein, contained in the program code structures 1292 and 1293. Alternatively, the instructions can be read from another computer-readable medium, such as a hard disk or a removable media drive. One or more processors in a multi-processing arrangement can also be employed to execute the sequences of instructions contained in the program code structures 1292 and 1293. In alternative embodiments, hard-wired circuitry can be used in place of or in combination with software instructions. Thus, the disclosed embodiments are not limited to any specific combination of hardware circuitry and software.

Additionally, the term "computer-readable medium" as used herein refers to any non-transitory medium that participates in providing instructions to the processor 1290 for execution. A computer-readable medium can take many forms, including, but not limited to, non-volatile media or volatile media. Non-volatile media includes, for example, optical, magnetic disks, and magneto-optical disks, or a removable media drive. Volatile media includes dynamic memory.

Also illustrated in FIG. 12, and as referenced above, is a generalized depiction of an MRI system program storage (memory) 1293, where stored program code structures are stored in non-transitory computer-readable storage media accessible to the various data processing components of the MRI system 1270. As those in the art will appreciate, the program store 1293 can be segmented and directly connected, at least in part, to different ones of the system 1272 processing computers having most immediate need for such stored program code structures in their normal operation (i.e., rather than being commonly stored and connected directly to the MRI system controller 1283).

Additionally, the MRI system 1270 as depicted in FIG. 12 can be utilized to practice exemplary embodiments described herein below. The system components can be divided into different logical collections of "boxes" and typically comprise numerous digital signal processors (DSP), microprocessors and special purpose processing circuits (e.g., for fast A/D conversions, fast Fourier transforming, array processing, etc.). Each of those processors is typically a clocked "state machine" wherein the physical data processing circuits progress from one physical state to another upon the occurrence of each clock cycle (or predetermined number of clock cycles).

Furthermore, not only does the physical state of the processing circuits (e.g., CPUs, registers, buffers, arithmetic units, etc.) progressively change from one clock cycle to another during the course of operation, the physical state of associated data storage media (e.g., bit storage sites in magnetic storage media) is transformed from one state to another during operation of such a system. For example, at the conclusion of an image reconstruction process and/or sometimes an image reconstruction map (e.g., coil sensitivity map, unfolding map, ghosting map, a distortion map etc.) generation process, an array of computer-readable accessible data value storage sites in physical storage media will be transformed from some prior state (e.g., all uniform "zero" values or all "one" values) to a new state wherein the physical states at the physical sites of such an array vary between minimum and maximum values to represent real world physical events and conditions (e.g., the internal physical structures of a patient over an imaging volume space). As those in the art will appreciate, such arrays of stored data values represent and also constitute a physical structure, as does a particular structure of computer control program codes that, when sequentially loaded into instruction registers and executed by one or more CPUs of the MRI system 1270, causes a particular sequence of operational states to occur and be transitioned through within the MRI system 1270.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method of machine learning, the method comprising:
learning, via processing circuitry during a training stage, network parameter values of a neural network to obtain a trained neural network configured to perform reconstruction of medical images;
refining, via the processing circuitry during a subsequent refinement stage, the learned network parameter values of the trained neural network to generate refined network parameter values defining a refined neural network; and
applying, via the processing circuitry, input medical image data to the refined neural network to generate a reconstructed medical image,
wherein the refining step further comprises
training a set of refined neural networks using a corresponding set of fixed values of a regularization parameter;
refining network weights for each refined neural network of the set of refined networks corresponding to the set of fixed values;
determining in the refinement stage, a particular value of the regularization parameter;
selecting a particular refined network of the set of refined neural networks corresponding to the determined particular value of the regularization parameter; and
applying the input medical image data to the selected particular refined neural network having the refined network weights.

2. The method of claim 1, wherein the network parameter values include the regularization parameter, and the method further comprises:
learning, in the training stage, a first value of the regularization parameter;
refining, in the refinement stage, the first value to a second value of the regularization parameter; and
applying the input medical image data to the refined neural network having the refined second value of the regularization parameter.

3. The method of claim 2, wherein the refining of the regularization parameter value further comprises refining the regularization parameter based on quantitative metrics, including a peak signal-to-noise ratio or a structural similarity index.

4. The method of claim 2, wherein the refining of the regularization parameter value further comprises refining the regularization parameter based on medical image characteristics, including a signal-to-noise ratio or a contrast.

5. The method of claim 1, where the refining step comprises refining the network parameters so that the reconstructed medical image is generated with less blur artefact.

6. The method of claim 1, where the refining step comprises refining the network parameters so that the reconstructed medical image is generated with less noise artefact.

7. The method of claim 1, where the refined neural network performs image reconstruction using an unrolled model that includes one or more unrolls, wherein each unroll contains both data consistency and network blocks, with relative weighting of the blocks set by the regularization parameter.

8. The method of claim 1, wherein the learning step further comprises learning network parameter values of the neural network to obtain the trained neural network, which is configured to perform reconstruction of magnetic resonance (MR) images.

9. A method of machine learning, comprising:
learning, via processing circuitry during a training stage, network parameter values of a neural network to obtain a trained neural network configured to perform reconstruction of medical images;
refining, via the processing circuitry during a subsequent refinement stage, the learned network parameter values of the trained neural network to generate refined network parameter values defining a refined neural network; and applying, via the processing circuitry, input medical image data to the refined neural network to generate a reconstructed medical image, wherein the network parameter values include a regularization parameter, the method further comprises learning, in the training stage, a first value of the regularization parameter;

refining in the refinement stage, the first value to a second value of the regularization parameter; and applying the input medical image data to the refined neural network having the refined second value of the regularization parameter, and the method further comprises displaying, on a display, the reconstructed medical image that is output from the refined neural network, and refining the regularization parameter value based on a preferred regularization parameter input based on the displayed reconstructed medical image.

10. An apparatus, comprising:

processing circuitry configured to learn, during a training stage, network parameter values of a neural network to obtain a trained neural network configured to perform reconstruction of medical images;

refine, during a subsequent refinement stage, the learned network parameter values of the trained neural network to generate refined network parameter values defining a refined neural network; and apply input medical image data to the refined neural network to generate a reconstructed medical image, wherein the processing circuitry is further configured to train a set of refined neural networks using a corresponding set of fixed values of a regularization parameter;

refine network weights for each refined neural network of the set of refined networks corresponding to the set of fixed values;

determine, in the refinement stage, a particular value of the regularization parameter;

select a particular refined network of the set of refined neural networks corresponding to the determined particular value of the regularization parameter; and apply the input medical image data to the selected particular refined neural network having the refined network weights.

11. The apparatus of claim 10, wherein the network parameter values include the regularization parameter, and the processing circuitry is further configured to learn, in the training stage, a first value of the regularization parameter;

refine, in the refinement stage, the first value to a second value of the regularization parameter; and apply the input medical image data to the refined neural network having the refined second value of the regularization parameter.

12. The apparatus of claim 11, wherein the processing circuitry is further configured to refine the regularization parameter value based on quantitative metrics, including a peak signal-to-noise ratio or a structural simulation index.

13. The apparatus of claim 11, wherein the processing circuitry is further configured to refine the regularization parameter value based on medical image characteristics, including a signal-to-noise ratio or a contrast.

14. The apparatus of claim 10, wherein the processing circuitry is further configured to refine the network parameters so that the reconstructed medical image is generated with less blur artefact.

15. The apparatus of claim 10, wherein the processing circuitry is further configured to refine the network parameters so that the reconstructed medical image is generated with less noise artefact.

16. The apparatus of claim 10, wherein the refined neural network is configured to perform image reconstruction using an unrolled model that includes one or more unrolls, wherein each unroll contains both data consistency and network blocks, with relative weighting of the blocks set by the regularization parameter.

17. The apparatus of claim 10, wherein the processing circuitry is further configured to learn network parameter values of the neural network to obtain the trained neural network, which is configured to perform reconstruction of magnetic resonance (MR) images.

18. An apparatus, comprising:

processing circuitry configured to learn, during a training stage, network parameter values of a neural network to obtain a trained neural network configured to perform reconstruction of medical images;

refine, during a subsequent refinement stage, the learned network parameter values of the trained neural network to generate refined network parameter values defining a refined neural network; and apply input medical image data to the refined neural network to generate a reconstructed medical image, wherein the network parameter values include a regularization parameter, the processing circuitry is further configured to learn, in the training stage, a first value of the regularization parameter;

refine, in the refinement stage, the first value to a second value of the regularization parameter; and apply the input medical image data to the refined neural network having the refined second value of the regularization parameter, the apparatus further comprises a display to display a reconstructed medical image that is output from the refined neural network, and the processing circuitry is further configured to refine the regularization parameter value based on a preferred regularization parameter input based on the displayed reconstructed medical image.

* * * * *